No. 874,286.
PATENTED DEC. 17, 1907.
L. F. BASSETT.
MACHINE FOR WORKING THE SOIL.
APPLICATION FILED APR. 20, 1907.
2 SHEETS—SHEET 1.
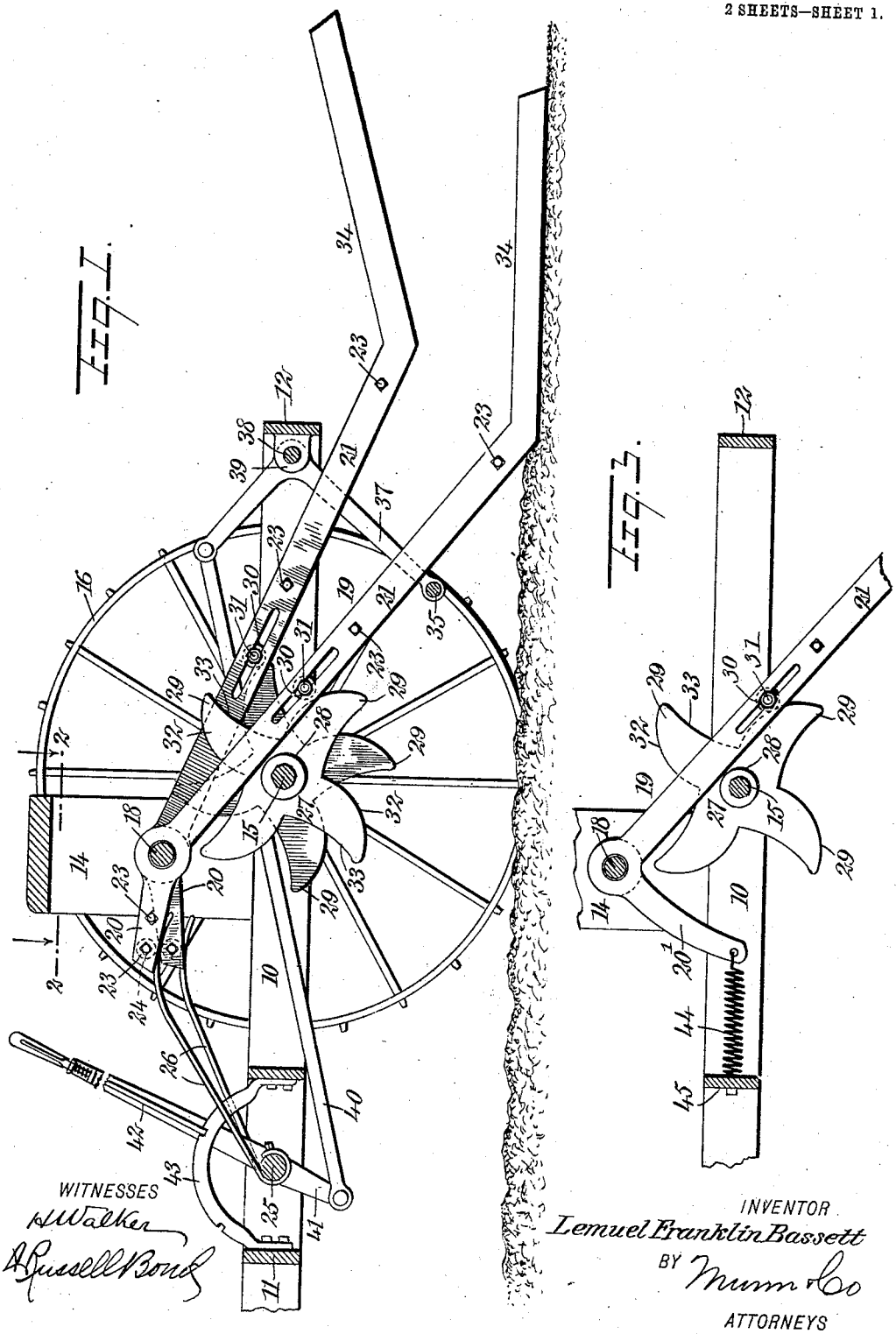
WITNESSES
H Walker
A Russell Bond
INVENTOR
Lemuel Franklin Bassett
BY Munn & Co
ATTORNEYS

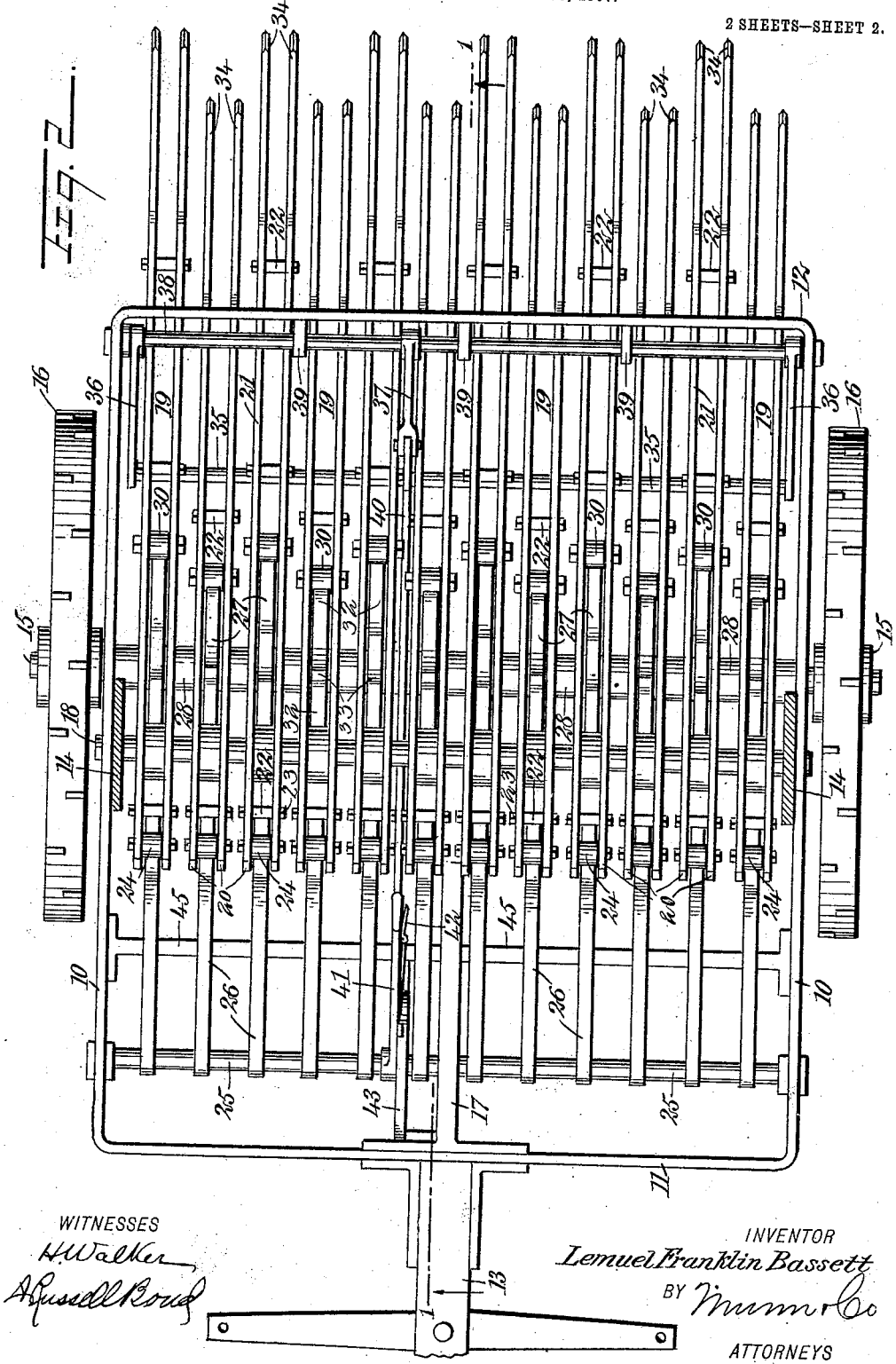

UNITED STATES PATENT OFFICE.

LEMUEL FRANKLIN BASSETT, OF REDDING, CALIFORNIA.

MACHINE FOR WORKING THE SOIL.

No. 874,286.      Specification of Letters Patent.      Patented Dec. 17, 1907.

Application filed April 20, 1907. Serial No. 369,230.

*To all whom it may concern:*

Be it known that I, LEMUEL FRANKLIN BASSETT, a citizen of the United States, and a resident of Redding, in the county of Shasta and State of California, have invented a new and Improved Machine for Working the Soil, of which the following is a full, clear, and exact description.

The object of the invention is to provide a machine adapted to break up or pulverize the soil of a field after it has been plowed and perhaps partially harrowed down, said machine being an improvement on a machine for which Letters Patent were granted to me November 13, 1906, Number 835,929.

The invention consists in the novel construction and combination of the several parts, as will be hereinafter fully set forth and pointed out in the claims.

Reference is to be had to the accompanying drawings forming a part of this specification in which similar characters of reference indicate corresponding parts in all the views.

Figure 1 is a longitudinal section through the machine taken practically on line 1—1 of Fig. 2; Fig. 2 is a plan view of the machine with parts in section on the line 2—2 of Fig. 1, and Fig. 3 is a partial longitudinal section, showing a modified form of certain details of the machine.

My machine is formed with a frame which, as represented in the drawings, is preferably rectangular, comprising side members 10, a forward member 11, and a rear member 12. Secured to the member 11 is a tongue or pole 13. An arch-frame 14 spans the machine and is secured to the side members 10 of the main frame. On the arch-frame 14 a seat may be secured for the operator. Journaled in the side members 10 of the main frame is an axle 15. Fixedly mounted on said axle at its outer ends, are a pair of traction wheels 16 on which the machine is normally supported. The axle 15 is supported at its center in a journal carried by a brace 17 which is secured to the frame member 11.

A shaft 18 lying parallel with the axle 15 is supported at its ends in the arch-frame 14. Journaled on this shaft are a series of beaters 19 consisting of pairs of parallel levers with short arms 20 at the forward side of the shaft and longer arms 21 extending rearwardly. These levers are coupled together in pairs by means of spacing members 22, the latter consisting of short studs reduced at the ends to enter openings in the levers. These reduced ends are threaded to receive nuts 23 which are screwed on the ends of the studs to clamp the levers together. At the end of the shorter arms 20 of each pair of levers, a spacing member 22 is secured on which is mounted a roller 24.

Extending from side to side of the machine and firmly secured in the side members 10 near their forward ends is a shaft 25. A series of springs 26 are coiled at one end around the shaft 25 and fastened thereto, while their opposite ends project rearward and engage the rollers 24. The springs exert an upward pressure on the rollers, hence tending to press the arms 21 downward.

Mounted on the axle 15 of the machine, are a series of cams or tripping wheels 27, one for each beater. These cams are formed with hubs 28, which space the cams uniformly on the axle 15 so that they occupy positions underneath their respective beaters 19. The axle 15 of the machine intermediate of its bearings in the frame members 10 and the brace 17 is preferably of polyhedral form, and the openings in the hubs of the cams are of a corresponding form, so that the cams 27 will turn with the wheels 16 as the machine is drawn along the ground. The cams 27 are provided with projections 29 which are adapted to engage rollers 30 mounted on spacing pieces 31 between adjacent levers.

The spacing members 31 are secured in slots in the lever arms 21 so that the cam rollers 30 may be adjusted to various positions on the lever. As the cams revolve when the machine is drawn over the field the projections will lift the arms 21 owing to their engagement with the cam rollers 30 and then clear the rollers 30 permitting the arms to drop. The lifting faces 32 of the projections 29 are preferably of convex form, as shown in the drawings, while the faces 33 on the opposite sides of the projections 29 are made concave so as to clear the rollers when the arms drop. By adjusting the position of the rollers on the beaters, the stroke of the beaters can be varied at will. The arms 21 of the levers are of such length that when released by the cams they will reach to the ground and at their lower ends they are formed with extensions 34 which are adapted to lie on the ground when the arms are in depressed position.

When it is desired the arms 21 may be lifted out of engagement with the cams 27, by means of a mechanism which I will now describe. This consists of a bar 35 which extends from side to side of the machine below the arms 21 of the beaters. This bar is secured by means of the crank arms 36 at each end, and the bell crank 37 at the center, to a shaft 38 which is journaled in bearings 39 formed on the rear member 12 of the frame, and is also supported at the ends in bearings in the frame members 10. Connected to the upper end of the bell crank 37 is a rod 40, whose opposite end is hinged to a lever 41 journaled on the shaft 25. The upper end of this lever which should be within convenient reach of the seat of the machine, is provided with a thumb latch 42 adapted to engage a rack 43. By throwing the lever 41 forward the bell crank 37 will be caused to turn on its axis, raising the bar 35 and thus lifting the arms 21 out of engagement with the cams.

In practice it is preferable to mount the cams 27 in such relative position that adjacent cams will act alternately to raise their respective arms 21. That is, the cams should be so spaced that while one is lifting its arm 21, the cams on either side of it will release their respective arms. Hence, while half of the arms 21 are rising, the other half will be falling and striking the ground. The advantage of this alternating movement is that it equalizes the drag of the machine along the ground. While the number of projections 29 on each cam may vary, I prefer to use a cam with four projections and I also prefer to mount the cams on an octahedral axle 15, so that in mounting them on the axle they can be set in alternate relation, that is, with a projection 29 of one lying intermediate of projections 29 of the next adjacent cam. In order that the cams may be interchangeable they are all made of exactly the same form. Hence, it will be evident that the axle on which they are mounted must necessarily have twice as many sides as the number of lobes or projections on each cam. Thus, if three-lobed cams are used, a hexahedral shaft must be used.

The operation of the machine will be readily apparent. As the machine is drawn over a field, the wheels 17 will revolve, and hence serve to revolve the cams 27 through the medium of the polyhedral shaft. These cams respectively engage the rollers 30 alternately raising the arms 21 of the beaters and dropping them to the ground, and thus by means of the extensions 34, beating and pulverizing the lumpy soil. The beaters 19 are assisted in their downward fall by the tension of the springs 26. Fig. 3 shows a modification of the invention, the beaters 19 being formed with short arms 20' which project approximately at right angles to the arms 21. Spiral springs 44 attached to the arms 20' are secured at their opposite ends to a cross brace 45, which connects the side members 10 of the frame. It will be obvious that the springs 44 act in a manner similar to the springs 26 to press the arms 21 downward, so that when they are released from engagement with the projections of the cams they will be assisted in their downward fall and strike the ground with greater force.

Having thus described my invention, I claim as new and desire to secure by Letters Patent.

1. In a machine for working the soil, a frame, means for supporting said frame, a shaft mounted in said frame, a beater mounted on said shaft, a roller mounted at one end of said beater, a spring mounted on said frame and engaging said roller, said spring serving to press the other end of said beater downwards, a trip device provided with offsets for alternately lifting and releasing engagement with said beater, and means for actuating said trip device.

2. In a machine for working the soil, a wheel-supported frame, a shaft mounted in said frame parallel with the axle, a beater mounted on said shaft, a roller adjustably mounted on said beater, and a cam mounted to turn with the axle and formed with offsets for alternately lifting and releasing engagement with said roller.

3. In a machine for working the soil, a wheel-supported frame, a shaft mounted in said frame parallel with the axle, a beater mounted on said shaft, a roller adjustably mounted on said beater, a cam mounted to turn with the axle and formed with offsets for alternately lifting and releasing engagement with said roller, and a spring acting to press said beater downwards when said roller is released from engagement with said cam.

4. In a machine for working the soil, a wheel-supported frame, a shaft mounted in said frame parallel with the axle, a beater mounted on said shaft, a roller mounted at one end of said beater, a spring engaging said roller and acting to press the other end of said beater downwards, a second roller adjustably mounted on said beater, and a cam mounted to turn with the axle and formed with offsets for alternately lifting and releasing engagement with said adjustably mounted roller.

5. In a machine for working the soil, a wheel-supported frame, a shaft mounted in said frame parallel with the axle, a beater mounted on said shaft, a roller mounted at one end of said beater, a spring engaging said roller and acting to press the other end of said beater downwards, a second roller adjustably mounted on said beater, a cam mounted to turn with the axle and formed with offsets for alternately lifting and releasing engagement with said adjustably mounted roller, and independent means for lifting said beater into inoperative position.

6. In a machine for working the soil, a wheel-supported frame, a shaft mounted in said frame parallel with the axle, a pair of levers mounted on said shaft, spacing members for coupling said levers together in spaced relation, a spring, a roller mounted to turn on one of said spacing members and engaging said spring, a cam mounted to turn with the axle, a stud adapted to be adjusted along said levers, and a roller mounted on said stud and engaging said cam, said cam being formed with projections having convex faces adapted to lift said last-named rollers and having concave faces adapted to release engagement with said last-named rollers.

7. In a machine for working the soil, a wheel-supported frame, a shaft mounted in said frame parallel with the axle, a pair of levers mounted on said shaft, coupling members coupling said levers together in spaced relation, a spring, a roller mounted to turn on one of said coupling members and engaging said spring, a cam mounted to turn with said axle, a stud adapted to be adjusted along said levers, a roller mounted on said stud and engaging said cam, a frame extending below said levers and mounted to swing, a bell crank connected to said frame, a lever, a rod connecting said bell crank with said lever, and a locking device for said lever.

8. In a machine for working the soil, a frame, an axle therefor, wheels secured upon the axle, a shaft journaled in said frame parallel with said axle, a series of beaters mounted on said shaft, each beater being formed of two levers coupled together in spaced relation with each other, a roller mounted at one end of each of said beaters, a spring engaging each of said rollers and serving to exert a downward pressure on the other end of each of said beaters, a series of cams, one for each beater, and a roller adjustably mounted on each of said beaters, said cams being mounted to turn with said axle and being formed with projections adapted to alternately lift and release engagement with said adjustably-mounted rollers, adjacent cams being mounted with the projections of one occupying positions intermediate of the projections of the other.

9. In a machine for working the soil, a frame, an axle therefor, wheels secured upon the axle, a shaft journaled in said frame parallel with said axle, a series of beaters mounted on said shaft, each beater being formed of two levers coupled together in spaced relation with each other, a roller mounted at one end of each of said beaters, a spring engaging each of said rollers and serving to exert a downward pressure on the other end of each of said beaters, a series of cams, one for each of said beaters, and a roller adjustably mounted on each of said beaters, said cams being mounted to turn with said axle and being formed with projections adapted to alternately lift and release engagement with said adjustably mounted rollers, said axle being polyhedral in form and having twice as many sides as the number of projections on each of said cams.

In testimony whereof I have signed my name to this specification in the presence of two subscribing witnesses.

LEMUEL FRANKLIN BASSETT.

Witnesses:
 EDWARD SWEENY,
 CLARENCE W. LEININGER.